US006957927B1

(12) United States Patent
Petersen (10) Patent No.: US 6,957,927 B1
(45) Date of Patent: Oct. 25, 2005

(54) REMOVABLE AIRCRAFT SERVICING PIT LID

(75) Inventor: Craig A. Petersen, Costa Mesa, CA (US)

(73) Assignee: Dabico, Inc., Costa Mesa, CA (US)

( * ) Notice: Subject to any disclaimer, the term of this patent is extended or adjusted under 35 U.S.C. 154(b) by 0 days.

(21) Appl. No.: 10/849,405

(22) Filed: May 20, 2004

(51) Int. Cl.[7] ............................................. E02D 29/14
(52) U.S. Cl. ......................................... 404/25; 52/19
(58) Field of Search ........................ 404/25, 26; 52/19, 52/20

(56) References Cited

U.S. PATENT DOCUMENTS

| | | | |
|---|---|---|---|
| 1,923,481 A | | 8/1933 | Ford |
| 2,883,853 A | * | 4/1959 | Forni .............................. 52/21 |
| 3,455,059 A | * | 7/1969 | Evans .......................... 49/397 |
| 4,467,932 A | | 8/1984 | Dabich |
| 4,669,625 A | | 6/1987 | Armstrong |
| 4,763,449 A | * | 8/1988 | Vigneron et al. .............. 52/20 |
| 4,840,514 A | * | 6/1989 | Defrance et al. ............. 404/25 |
| 5,056,955 A | * | 10/1991 | Spiess et al. ................. 404/25 |
| 5,082,392 A | | 1/1992 | Marchese et al. |
| 5,324,135 A | | 6/1994 | Smith |
| 5,366,317 A | | 11/1994 | Solimar |
| 5,394,650 A | | 3/1995 | Dean |
| 5,404,676 A | | 4/1995 | Devlin |
| 5,465,862 A | | 11/1995 | Devlin |
| 5,507,590 A | | 4/1996 | Argandona |
| 5,600,921 A | | 2/1997 | Vardaro |
| 5,950,368 A | | 9/1999 | Bradford |
| 6,199,414 B1 | | 3/2001 | Chang |
| 6,588,810 B1 | * | 7/2003 | Monneret ................... 292/200 |
| 6,749,363 B1 | * | 6/2004 | Petersen ....................... 404/25 |
| 6,752,565 B2 | * | 6/2004 | Schrage ....................... 404/25 |

OTHER PUBLICATIONS

U.S. Appl. No. 09/693,507, filed Oct. 23, 2000, Petersen.
Drawing of Steel Liner Service Pit, Model CM-18, Culligan & McCallum, Jan. 1, 1981, Pg Misc-5.0.
Drawing of Fiberglass Service Pit, Model FG-18, Culligan & McCallum, Jan. 1, 1981, Pg Misc-7.0.

\* cited by examiner

*Primary Examiner*—Thomas B. Will
*Assistant Examiner*—Alexandra Pechhold
(74) *Attorney, Agent, or Firm*—Charles H. Thomas (57) ABSTRACT

An aircraft servicing pit is provided that has a pit lid set within a supporting frame and hinged for rotation relative to a pit access opening. However, the pit lid is also completely detachable from the surrounding frame once it opened. The pit lid support has a flat deck surface with an access opening surrounded by a supporting rim located beneath the deck surface. A hinge pocket is defined in the structure of the pit lid support. A pair of hinge axle end slots are formed on the opposite sides of the pit lid support frame and are inclined upwardly and outwardly. The pit lid has a hinge leaf with a pair of hinge axle ends projecting transversely therefrom in opposite directions. The hinge axle ends engage the hinge axle end slots and are entrapped therein when the pit lid is closed. When the pit lid is open to the point where the pit lid is in generally coplanar relationship relative to the hinge axle end slots, the hinge axle ends can be easily withdrawn from the slots and the pit lid removed completely from its supporting frame. Complete detachment of the pit lid in this fashion eliminates obstructions otherwise presented by the pit lid and its hinge in drawing cables and hoses out of the pit enclosure.

8 Claims, 6 Drawing Sheets

FIG.6

REMOVABLE AIRCRAFT SERVICING PIT LID

BACKGROUND OF THE INVENTION

1. Field of the Invention

The present invention relates to a heavy duty hinge for an aircraft service pit lid assembly that is used to provide access to subsurface pits located beneath airport runways, docking areas, and other surfaces across which aircraft travel.

2. Description of the Prior Art

At airports and airfields throughout the world, aircraft ground support electricity, air conditioning, fuel, and other aircraft servicing necessities are provided from pits located beneath the surfaces across which the aircraft travel while on the ground. These pits provide subsurface terminations for aircraft servicing facilities such as fuel lines, electrical power supply lines, air conditioning ducts, and other auxiliary services which are provided to aircraft that are on the ground. The use of subsurface pits serves to reduce the congestion of motorized vehicles and lines running across the aircraft servicing areas that would otherwise exist.

Aircraft servicing pits typically take the form of hollow, fiberglass enclosures that are buried in excavated holes dug beneath aircraft servicing areas. Fuel lines, electrical lines, air conditioning lines and other ground support auxiliary service lines are typically laid down during the construction of the airport or aircraft terminal in trenches that are ultimately filled in. These lines run from the terminal facility to the aircraft servicing pits and are accessible through aircraft servicing pit lid assemblies that are located at atop the pits. The pit lid assemblies employ surrounding frames in which pit lids are mounted by hinges for upward rotation about horizontal axes of rotation.

The pits that are mounted within the pit lid supporting frames are typically hinged for rotation relative to the frames by one or more hinge leaves that project laterally from the structure of the pit. Various hinge pin mechanisms have been employed that permanently attach the pit lid leaves to the surrounding pit lid supporting frames. One highly useful pit lit hinge mounting arrangement of this type is described in prior U.S. application Ser. No. 09/693,507 filed Oct. 23, 2000, presently pending. The disclosure of which is hereby incorporated by reference in its entirety.

In conventional practice pit lids are permanently mounted for hinged movement relative to their surrounding frames. By permanently mounting the lid to the frame the pit lid cannot be torn loose from its mounting, even if subjected to extremely high winds or the direct blast of a jet engine.

There are some instances in which it would be advantageous for a pit lid for a subsurface aircraft servicing pit to be completely removable, however. For example, if an aircraft to be serviced is located directly behind the hinge or hinges of a pit lid for a subsurface aircraft servicing pit, cables and hoses drawn out of the pit must be pulled directly past the pit hinge and into contact therewith. The hoses and cables will frequently snag upon the hinge as they are drawn out of the pit, thus requiring time and attention to free them up. This increases the time and difficulty involved in servicing the aircraft.

At the time of pit installation the likely location of aircraft to be serviced is considered in orienting the pit lid support so as to locate the hinge or hinges where they will create the least interference. However, the docking and maneuvering patterns of aircraft are changed constantly. Therefore, even though the orientation and location of the pit lid hinge may be chosen properly for foreseeable aircraft operations at the time of pit installation, aircraft movement patterns in the vicinity of these subsurface pits often can and do change. Therefore, there is a considerable likelihood that, when a hinged pit lid is opened to permit the withdrawal of hoses and cables for servicing an aircraft, the hinge is likely to be at a location between the pit access opening and the aircraft.

Removable pit lids have been utilized in the past, for example, two-handed pit covers were employed for closing smaller pit openings in aircraft service pits such as the CM-18 steel service pit and the FG-18 fiberglass service pit manufactured by Dabico, Inc., located at 2995 Airway Avenue, Costa Mesa, Calif. 92626. However, one significant difficulty with conventional removable pit covers is that, since they lack a hinge mechanism, they are quite heavy and require considerable strength for removal and repositioning to close the pit access opening. Unlike a hinged pit cover in which a portion of the weight of the lid is transmitted to the hinge pins as the lid is raised, an unhinged pit cover must be bodily lifted upwardly, with the entire weight of the lid carried by the person or persons removing the lid.

SUMMARY OF THE INVENTION

The present invention is an improved pit lid arrangement for a subsurface aircraft servicing pit that combines the advantages of a hinged pit lid but avoids the disadvantages thereof. That is, the pit lid of the invention is advantageous in that it does include a hinge mechanism that supports a portion of the weight of the lid as the pit is opened. However, once the pit lid of the invention has been opened, it is possible for it to be completely detached and removed from the supporting frame so as to avoid obstructions to the withdrawal and maneuvering of lines and cables pulled out of the pit.

On the other hand, the hinge can be reengaged with the pit lid supporting frame once aircraft servicing operations are complete and the hoses and cables drawn back into the pit. Reengagement of the hinge mechanism with the pit lid support facilitates lowering of the pit lid when the access opening is to be closed.

A primary object of the invention is to provide an aircraft servicing pit lid that can be completely detached from the pit access opening when the lid is open, but which will remain securely engaged with the pit mounting frame when the pit lid is closed. That is, the pit lid can be completely detached from its supporting frame once it has been rotated about its hinge axis into an open condition. However, when the pit lid is shut, the hinge mechanism is captured so that the pit lid cannot be removed from its supporting frame.

In one broad aspect the present invention may be considered to be an aircraft servicing pit comprising: a subsurface pit enclosure buried beneath the ground surface across which aircraft travel while on the ground, a pit lid support having an upper face level with the ground surface and located atop the subsurface pit, and a pit lid having a body, a hinge leaf projecting laterally from the body, and a pair of hinge axle ends projecting in opposite directions from opposite sides of the hinge leaf. The pit lid support has an access opening down into the pit surrounded by a lid supporting rim located beneath the upper face of the pit lid support. The pit lid support also has a hinge pocket having opposing side walls defined in the pit lid support immediately adjacent the lid access opening and the lid supporting rim. A pair of hinge axle end slots are defined in the lid support on opposing sides of the hinge pocket. These slots extend in opposite directions from the opposing hinge pocket side walls.

The hinge axle end slots are inclined upwardly and away from the access opening and in opposite directions from the opposing hinge pocket side walls. The hinge axle end slots intercept the upper face of the pit lid support.

The pit lid body is configured to seat upon the lid supporting rim and thereby close the access opening. The hinge axle ends on the leaf hinge extend into the pair of inclined slots. The pit lid is completely removable from the hinge support when swung open to a disposition beyond perpendicular alignment with the upper face of the pit lid support. The hinge axle ends are captured in the hinge axle end slots when the pit lid is shut to close the access opening.

In another broad aspect the invention may be considered to be an aircraft servicing pit with a detachable lid comprising: a subsurface aircraft serving pit enclosure buried beneath a ground surface across which aircraft travel during docking and undocking; a pit lid support disposed atop the subsurface pit; and a pit lid configured to seat within the confines of the pit lid support. The pit lid support has a flat upper surface level with the ground surface and defines a lid seating ring recessed beneath the flat upper surface. A hinge seating pocket is defined in the pit lid support adjacent the lid seating ring. The hinge seating pocket includes a pair of mutually opposing hinge pocket side walls and a hinge pocket end wall extending therebetween.

Inclined hinge axle end receiving slots are defined in the flat upper surface of the pit lid support. The hinge axle end receiving slots reside in mutually coplanar relationship and intersect both the hinge pocket side walls. The hinge axle end receiving slots are inclined downwardly from the flat upper surface and toward the lid seating ring. The pit lid is configured to seat within the confines of the pit lid support upon the lid seating ring.

The pit lid has a hinge leaf projecting laterally into the hinge pocket. Hinge axle ends project transversely in opposite directions from each other and from the hinge leaf and into the hinge axle end slots. The hinge axle ends are captured in the hinge axle end slots when the pit lid is seated on the seating ring. The pit lid is completely detachable from the lid support when the pit lid is unseated from the seating ring and rotated back away from the seating ring.

In still another broad aspect the invention may be considered to be an aircraft service pit lid assembly comprising a lid frame, a pit lid, and a leaf hinge projecting from the pit lid. The lid frame has a structure defining a flat upper deck, an access opening encompassed within an upwardly facing peripheral bearing ledge that is lower than and surrounded by the deck, and a hinge leaf pocket. The hinge leaf pocket is formed in the frame structure adjacent the access opening to define a pair of opposing pocket side walls. A pair of hinge axle end seating slots extend into the deck of the frame structure and through both of the pocket side walls. The seating slots are in mutually coplanar alignment with each other and extend at an inclination downwardly from the deck and inwardly toward the access opening. The hinge axle end slots terminate no lower than the level of the bearing ledge.

The pit lid is configured to seat atop the bearing ledge within the frame structure. The leaf hinge projects from the pit lid and into the hinge leaf pocket. Hinge axle ends project in opposite directions from the hinge leaf and are engageable in the hinge axle end slots. The hinge axle ends are captured therein when the pit lid is seated atop the bearing ledge. The hinge axle ends are disengageable from the hinge axle end slots so as to permit complete detachment of the pit lid from the lid frame when the pit lid is unseated from the bearing ledge.

In still another broad aspect the invention may be considered to be an aircraft service pit lid assembly comprising a frame having a flat horizontal deck with hinge axle end slots that intersect the deck, a lid with a hinge leaf, and horizontally disposed hinge axle ends extending transversely from the hinge leaf. The frame is provided for installation into a surface across which aircraft travel.

The frame defines a pit access opening therethrough entirely within its structure. The access opening is surrounded by the flat horizontal deck. The structure of the frame has a recessed bearing ledge beneath the deck and encompassing the access opening. A hinge pocket is formed in the structure of the frame recessed beneath the deck adjacent the access opening. The hinge pocket has mutually opposing upright pocket side walls extending downwardly from the deck.

A pair of inclined hinge axle end slots are defined in the deck on opposing sides of the hinge pocket. The hinge axle end slots intersect the deck and the pocket side walls. The hinge axle end slots are inclined downwardly from the deck and toward the access opening. The hinge axle end slots are in coplanar relationship with each other.

The lid has a flat upper surface and is formed of a size and shape that fits within the lateral confines of the deck. When the lid rests upon the bearing ledge, the hinge leaf projects laterally outwardly from the lid and into the hinge pocket. The hinge axle ends extend transversely from the hinge leaf and beyond the upright pocket side walls and into the hinge axle end slots. The hinge axle ends thereby form a horizontal axis of rotation relative to the frame that is beneath the level of the deck. The hinge axle ends are captured in the hinge axle end slots when the lid is lowered to rest upon the bearing ledge. The hinge axle ends are completely disengageable from the hinge axle end slots when the pit lid is raised to expose the access opening.

The hinge axle end slots must be inclined at an obtuse angle of greater than ninety degrees, and preferably about one hundred twenty degrees relative to the upper surface of the pit lid support in which they are formed. The slots are preferably milled or molded into the structure of the pit lid support and are of a uniform width and depth through their lengths.

The invention may be described with greater clarity and particularity by reference to the accompanying drawings.

DESCRIPTION OF THE EMBODIMENT

FIGS. 1 through 4 illustrate an aircraft service pit lid assembly 10 according to the invention. The pit lid assembly 10 is comprised of a pit lid frame or support 12 adapted for installation into a surface 14 across which aircraft travel when on the ground during arrival, departure, docking, and undocking movements. In the embodiment of the invention illustrated in the drawings the lid frame 12 is of a circular, annular configuration, although pit lid frames are also formed in square and rectangular configurations as well. The pit lid frame 12 defines a perimeter with a short, upright, cylindrical wall or edge 16, visible in FIG. 1.

Figure 6:
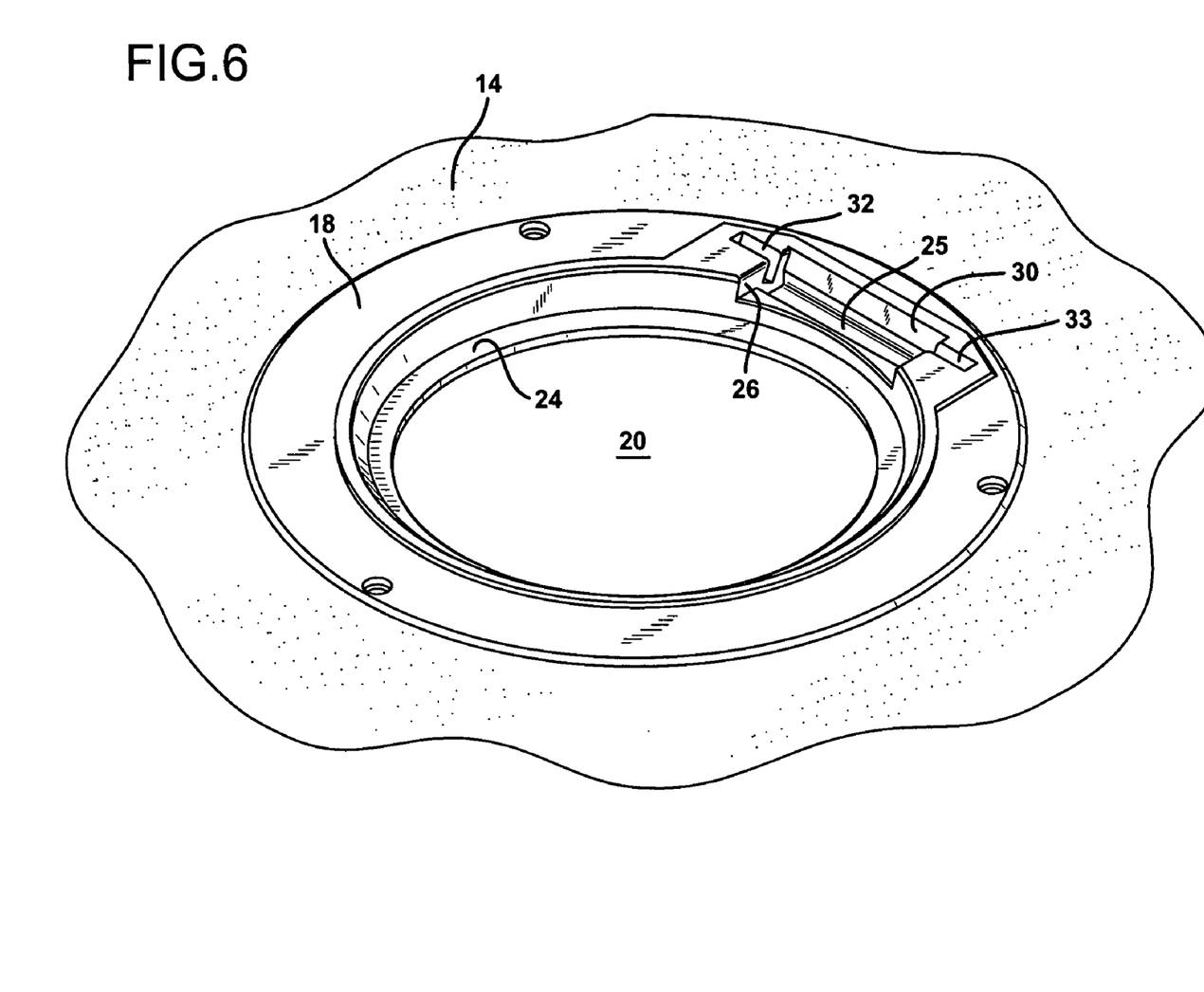
FIG. 6 is a perspective view of the pit lid support of the aircraft service pit lid assembly shown after the pit lid has been completely detached therefrom.

The structure of the pit lid frame 12 is formed with a flat, horizontal deck 18 of a generally cylindrical, annular shape. As best illustrated in FIG. 6, a central, circular access opening 20 is defined in the structure of the pit lid frame 12 at the approximate center thereof. The access opening 20 provides access down into the pit enclosure within the subsurface walls 22 of the pit, shown in FIG. 3. At the mouth of the access opening 20 there is a radially inwardly projecting lid supporting rim 24 forming a flat, horizontal, annular, upwardly facing bearing surface. The supporting rim 24 is located beneath and is parallel to the upper face of the deck 18 of the pit lid support 12. The lid seating ring 24 forms a peripheral bearing ledge at the access opening 20.

The structure of the lid frame 12 is also formed with a hinge pocket 25 that is adjacent the access opening 20. The hinge pocket 25 is illustrated best in FIGS. 2 and 6 and includes a pair of mutually parallel, opposing hinge pocket side walls 26 and 28 and a hinge pocket end wall 30 extending therebetween remote from the access opening 20. The hinge pocket 25 thus created is a generally rectangular-shaped recess in the deck 18 of the pit lid support frame 12.

Figure 3:
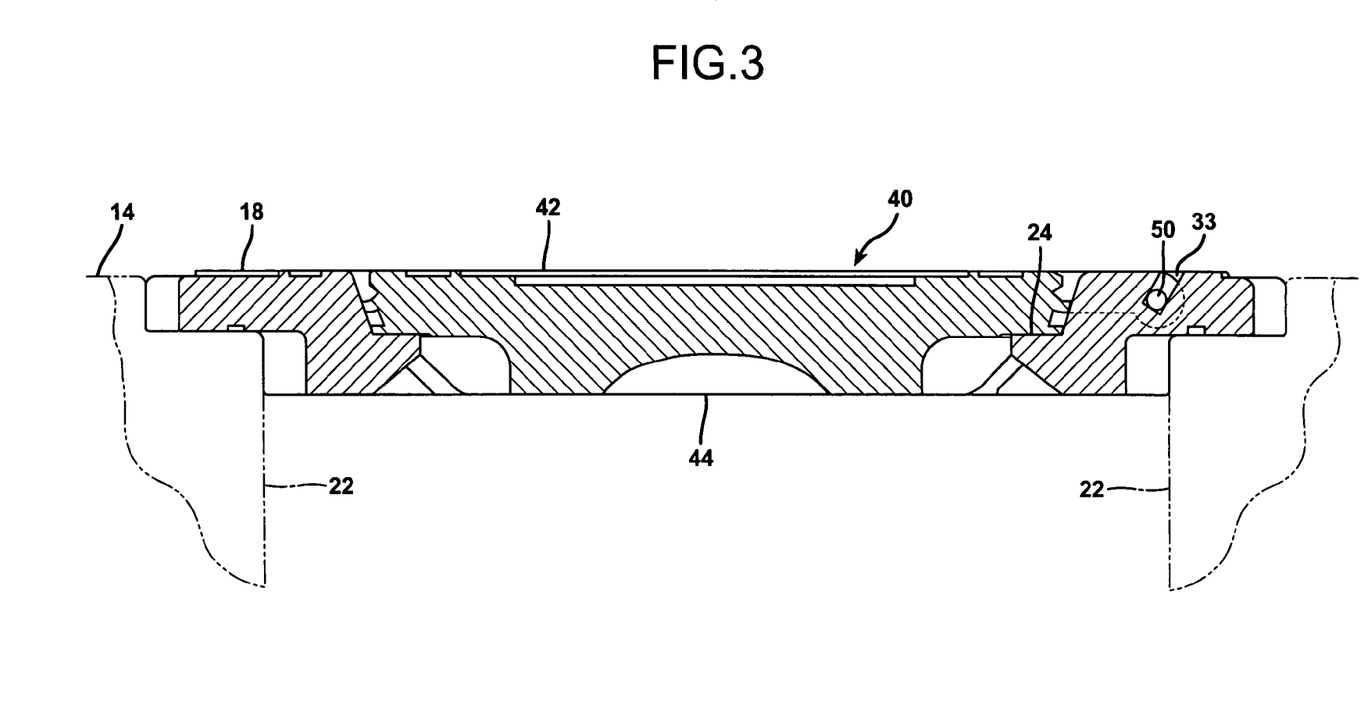
FIG. 3 is a side sectional view taken along the lines 3—3 in FIG. 2.
Figure 4:
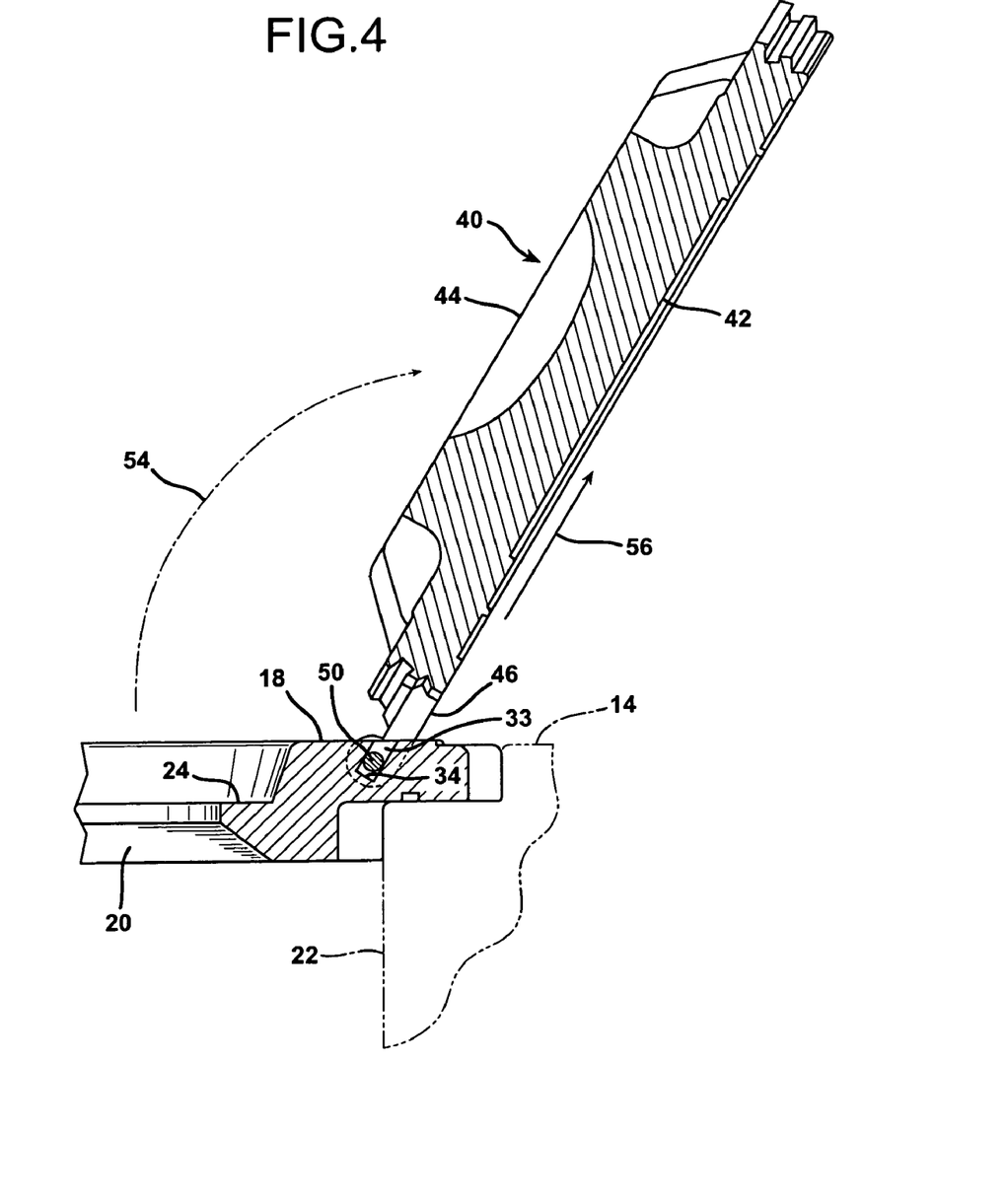
FIG. 4 is a side sectional view showing the pit lid of FIG. 3 in an open condition.
Figure 5:
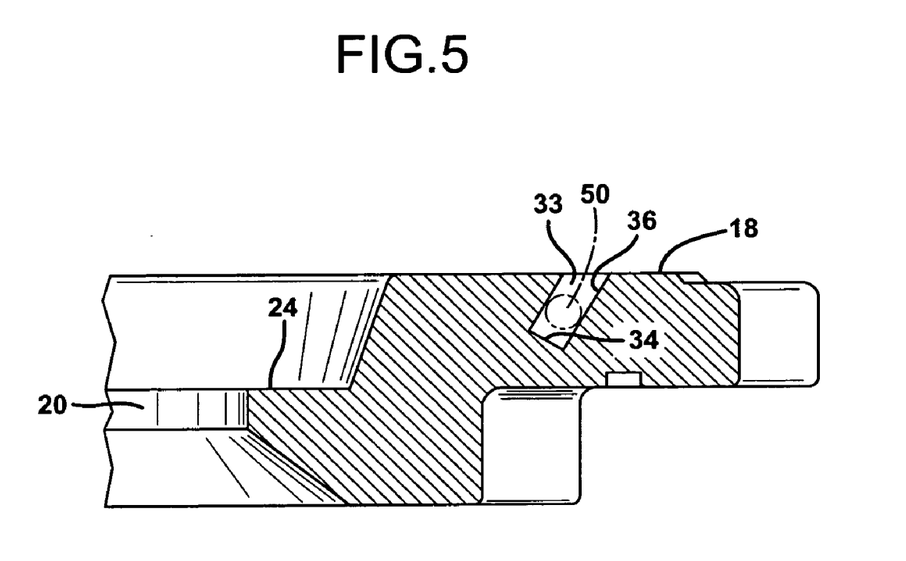
FIG. 5 is a sectional elevational detail illustrating one of the hinge axle end slots in the pit lid support.

As illustrated in FIGS. 3, 4, 5, and 6, a pair of inclined hinge axle end receiving slots 32 and 33 are defined in the flat upper surface of the deck 18 of the pit lid support 12. The hinge axle end receiving slots 32 and 33 reside in coplanar relationship with each other and are perpendicular to both of the hinge pocket side walls 26 and 28. As illustrated in FIG. 5, the hinge axle end receiving slots 32 and 33 are inclined downwardly and toward the lid seating ring 24 from the flat, upwardly facing deck surface 18 of the pit lid support 12.

The hinge axle end receiving slots 32 and 33 are oriented at an angle greater than ninety degrees, considered with respect to the area of the flat surface of the deck 18 lying between the slot openings in the deck and the pit access opening 20. Preferably, the hinge axle end slots 32 and 33 are oriented at an obtuse angle of about one hundred twenty degrees relative to the upper face 18 of the lid support 12.

The slots 32 and 33 are preferably each about 0.53 inches in width, as measured across their bottom surfaces 34, and each have a length of about 1.19 inches as measured between the bottom surface 34 and upwardly facing surface of the deck 18 along the back side 36 of each slot 32 and 33. The slots 32 and 33 are preferably of a uniform depth of about 2.05 inches as measured from their intersections with the hinge pocket side walls 26 and 28 toward their mutually remote extremities.

The aircraft service pit lid assembly also includes a generally disc-shaped pit lid 40 which has a flat, generally circular upper exposed surface 42 and a concave, dished out undersurface 44. On one side of the body of the pit lid a conventional handgrip pocket 45 is defined in the upper surface 42. The handgrip pocket 45 is located diametrically opposite a hinge leaf 46 that extends laterally from the other side of the pit lid 40.

The pit lid 40 may be formed of aluminum or stainless steel and has a periphery configured to seat within the confines of the pit lid support 12 and to rest with its peripheral margin upon the lid seating ring 24. The hinge leaf 46 of the pit lid 40 projects laterally, in a radial direction as considered with respect to the center of the pit lid 40. The hinge pocket 25 is bounded laterally by the hinge pocket side walls 26 and 28 and the hinge pocket end wall 30, as illustrated in FIGS. 2 and 6.

The pit lid 40 is also equipped with a pair of hinge axle ends 48 and 50 that project in opposite directions from each other from the opposite sides of the hinge leaf 46 so as to extend into the pair of inclined hinge axle end slots 32 and 33. The hinge axle ends 48 and 50 are preferably formed as the ends of a single rod projecting transversely in opposite directions beyond the side edges of the hinge leaf 46. In this arrangement a transverse bore is drilled through the hinge leaf 46 so that the rod may be inserted into the bore with its ends protruding transversely therefrom in both directions. A set screw is directed into a tapped bore in the hinge leaf to intercept the rod and prevent it from shifting relative to the hinge leaf. Alternatively, the hinge axle ends 48 and 50 may be formed as transversely outwardly directed integrally formed or inserted pins, pintles, spindles or studs if the pit lid 40 is formed as a casting.

With either construction, or with any alternative equivalent construction, the horizontally disposed hinge axle ends 48 and 50 extend transversely from the hinge leaf 46 and beyond the upright pocket side walls 26 and 28 and into the hinge axle end slots 32 and 33. The hinge axle ends 48 and 50 are linearly aligned with each other and thereby form a horizontal axis of rotation relative to the frame 12 that lies beneath the level of the deck 18.

Figure 1:
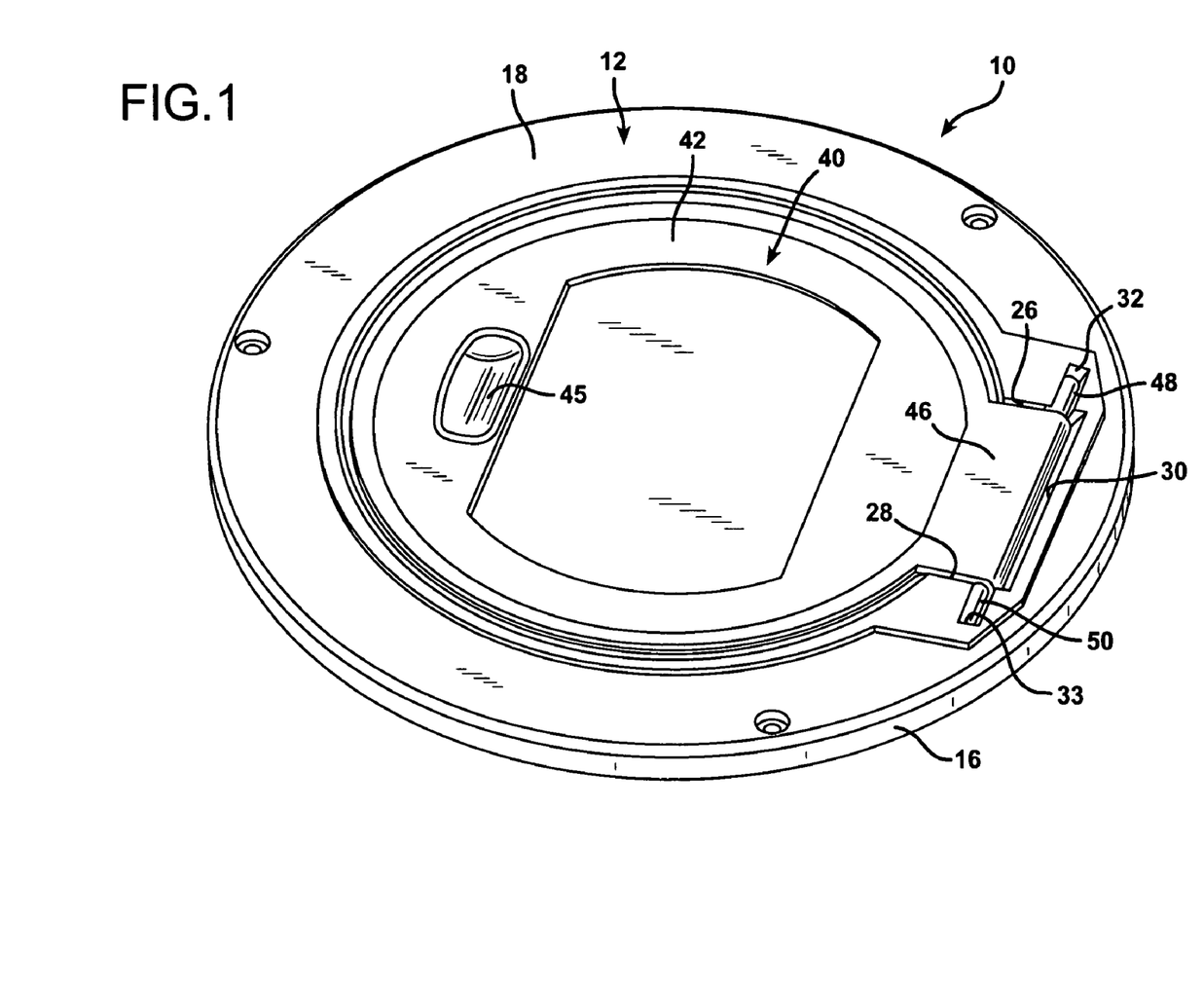
FIG. 1 is a perspective view of an aircraft service pit lid assembly constructed according to the present invention, shown with the pit lid in a closed condition.
Figure 2:
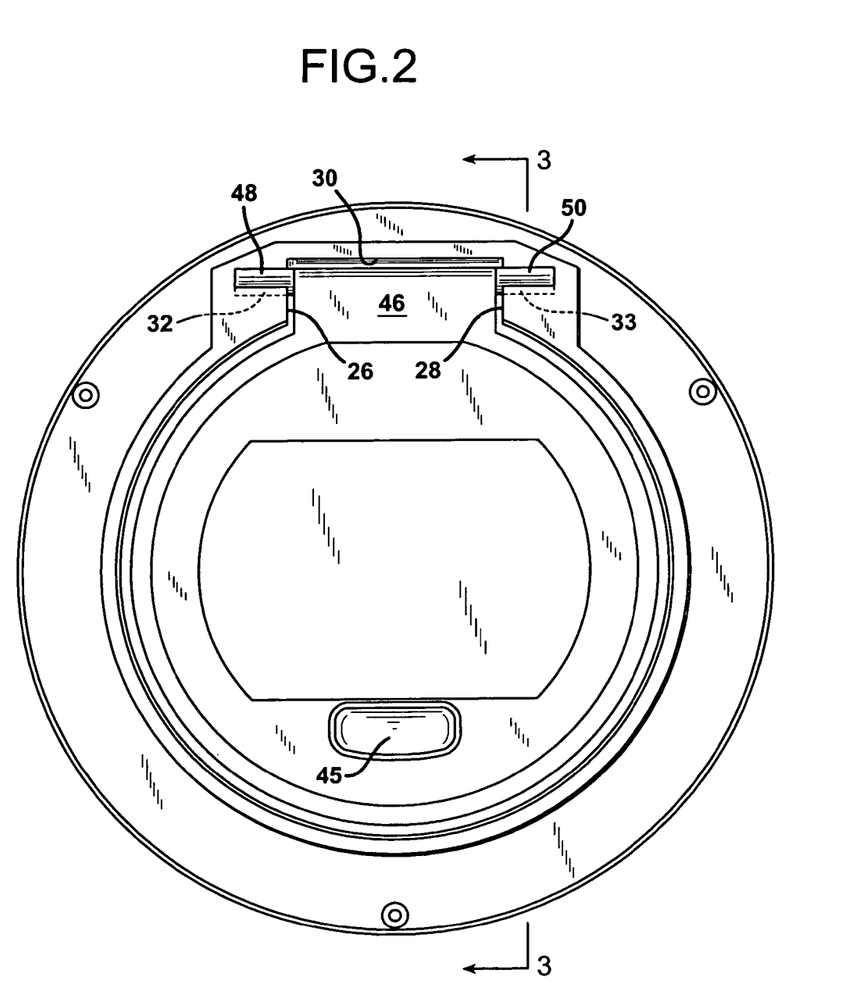
FIG. 2 is a top plan view of the aircraft service pit lid assembly of FIG. 1.

As illustrated in FIGS. 2 and 3, the hinge axle ends 48 and 50 are captured in the hinge axle end slots 32 and 33 when the lid 40 is lowered so as to rest upon the bearing ledge 24. It can be seen that as long as the body of the pit lid 40 remains lodged in position within the laterally surrounding confines of the pit lid support 12 seated upon the bearing ledge 24 beneath the level of the deck 18, the hinge axle ends 48 and 50 will be held below the level of the deck 18. The hinge axle ends 48 and 50 are thereupon trapped due to the inclination of the hinge axle end slots 32 and 33.

On the other hand, when the pit lid 40 is open, as illustrated in FIG. 4, it can be completely detached from the pit lid support frame 12. The pit lid 40 may be opened by grasping its free end remote from the hinge leaf 46 using the hand pocket 45. The edge of the pit lid 40 remote from the hinge leaf 46 is then rotated upwardly and across the center of the access opening 20 as indicated by the directional arrow 54 in FIG. 4 until the pit lid 40 resides in an orientation at an obtuse angle, as illustrated in FIG. 4. When the pit lid 40 is brought into the upwardly and outwardly inclined disposition illustrated in FIG. 4, relative to the horizontal deck surface 18 of the pit lid frame 12, the entire pit lid 40 may be moved in translation upwardly as indicated by the directional arrow 56 in FIG. 4. This motion is parallel to the inclination of the hinge axle end slots 32 and 33. The pit lid 40 can thereby be pulled upwardly at an incline away from the hinge pocket 25.

The hinge axle ends 48 and 50 will easily slide out of the hinge axle end slots 32 and 33 when the pit lid 40 is at the angular orientation illustrated in FIG. 4. The pit lid 40 can thereupon be complete detached from the pit supporting frame 12, leaving the pit supporting frame 12 completely open, as illustrated in FIG. 6. As is apparent from that drawing figure, hoses and cables can then be drawn up and out of the pit enclosure and pulled in any direction across the deck 18 of the pit lid frame 12 without snagging or obstruction from the pit lid 40.

When aircraft servicing operations have been completed and the pit lid 40 is to be closed, the process is reversed. That is, all of the hoses and cables are returned to the enclosure of the buried pit within the confines of the subsurface walls 22 thereof. The pit lid 40 is then brought to the position of FIG. 4 with the hinge axle ends 49 and 50 in registration with the hinge axle end slots 32 and 33. The pit lid 40 is then lowered at an inclination in a direction opposite to the directional arrow 56 in FIG. 4, thereupon seating the hinge axle ends 48 and 50 on the bottom surfaces 34 in the hinge axle end slots 32 and 33. The pit lid 40 can then be rotated shut in the direction opposite the directional arrow 54 illustrated in FIG. 4.

While the hinge axle end slots 32 and 33 may be oriented at various angles of inclination, when the inclination is at one hundred twenty degrees, the pit lid 40 is at an ergonomically preferable height and orientation for lifting it free from the hinge axle end slots 32 and 33. Once detached from the pit lid frame 12, the pit lid 40 can be placed anywhere upon the surrounding surface 14 where it will be out of the way. The detachable coupling arrangement provided between the pit lid 40 and its supporting frame 12 allows three hundred sixty degree access through the access opening 20 to the contents inside the pit.

The detachable hinge axle end connection arrangement of the invention is preferable to a two-hand lift door, since the lifting weight required to open the door from a closed position is approximately half that required to commence lifting of a conventional, two-hand lift door. Furthermore, this mechanical advantage is increased as the door is pulled open, since the force required to swing the door open from its closed position to an open position decreases as the orientation of the door approaches an angle of ninety degrees relative to horizontal.

Undoubtedly, numerous variations and modifications of the invention will become readily apparent to those familiar with subsurface aircraft servicing pit lid assemblies. Accordingly, the scope of the invention should not be construed as limited to this specific embodiment depicted and described, but rather is defined in the claims appended hereto.

What is claimed is:

1. An aircraft servicing pit comprising:
   a subsurface pit enclosure buried beneath a ground surface across which aircraft travel while on the ground,
   a pit lid support having an upper face level with said ground surface and located atop said subsurface pit and having an access opening down into said pit enclosure surrounded by a lid supporting rim located beneath said upper face, a hinge pocket having opposing side walls defined in said pit lid support immediately adjacent said lid access opening and said lid supporting rim, and a pair of hinge axle end slots defined in said lid support on opposing sides of said hinge pocket and extending in opposite directions from said opposing hinge pocket side walls, and said hinge axle end slots have bottom surfaces and are straight and are of a uniform width and depth throughout their lengths and are inclined upwardly and away from said access opening and intersect said upper face of said pit lid support,
   a pit lid having a body configured to seat upon said lid supporting rim and thereby close said access opening and having a hinge leaf projecting laterally from said body and including a pair of hinge axle ends of uniform circular cross section throughout projecting in opposite directions from opposite sides of said hinge leaf so as to extend into said pair of hinge axle end slots, and said pit lid is completely removable from said lid support when swung open to a disposition beyond perpendicular alignment with said upper face of said pit lid support and said hinge axle ends are captured in said hinge axle end slots and seat against said bottom surfaces of said hinge axle end slots when said pit lid is shut to close said access opening.

2. An aircraft servicing pit according to claim 1 wherein said hinge axle end slots are oriented at an angle of about one hundred twenty degrees relative to said upper face of said lid support.

3. An aircraft servicing pit with a detachable lid and comprising:
   a subsurface aircraft servicing pit enclosure buried beneath a ground surface across which aircraft travel during docking and undocking,
   a pit lid support disposed atop said subsurface pit and having a flat upper surface level with said ground surface and defining a lid seating ring recessed beneath said flat upper surface, a hinge seating pocket adjacent said lid seating ring including a pair of mutually opposing hinge pocket side walls and a hinge pocket end wall extending therebetween, and straight, inclined hinge axle end receiving slots defined in said flat upper surface of said pit lid support, wherein said hinge axle end receiving slots reside in mutually coplanar relationship and intersect both said hinge pocket side walls and are inclined downwardly from said flat upper surface and toward said lid seating ring and said hinge axle end receiving slots are of a uniform width and depth throughout their lengths and have bottom surfaces remote from said flat upper surface of said pit lid support, and
   a pit lid configured to seat within the confines of said pit lid support upon said lid seating ring and having a hinge leaf projecting laterally into said hinge pocket, and hinge axle ends of uniform circular cross section throughout projecting transversely in opposite directions from each other and from said hinge leaf and into said hinge axle end slots, whereby said hinge axle ends are captured in said hinge axle end slots and seat upon said bottom surface of said hinge axle end slots when said pit lid is seated on said seating ring and said pit lid is completely detachable from said lid support when said pit lid is unseated from said seating ring and rotated back away from said seating ring.

4. An aircraft servicing pit according to claim 3 wherein said hinge axle end slots are oriented at an obtuse angle of about one hundred twenty degrees relative to said upper face of said lid support.

5. An aircraft service pit lid assembly comprising:
   a lid frame having a structure defining a flat upper deck, an access opening encompassed within an upwardly facing peripheral bearing ledge that is lower than and surrounded by said deck, and a hinge leaf pocket formed in said frame structure adjacent said access opening to define a pair of opposing pocket side walls, and a pair of hinge axle end seating slots extending into said deck of said frame structure and through both of said pocket side walls, and said seating slots are straight and are of a uniform width and depth throughout their lengths and in mutually coplanar alignment with each other and extend at an inclination downwardly from said deck and inwardly toward said access opening, and said hinge axle end slots terminate at bottom surfaces no lower than the level of said bearing ledge;
   a pit lid configured to seat atop said bearing ledge within said frame structure;
   a hinge leaf projecting from said pit lid and into said hinge leaf pocket and having hinge axle ends of uniform circular cross section throughout that project in opposite directions from said hinge leaf and are engageable in said hinge axle end slots and are captured therein and seat upon said bottom surfaces of said hinge axle end slots when said pit lid is seated atop said bearing ledge and said hinge axle ends are disengageable from said hinge axle end slots so as to permit complete detachment of said pit lid from said lid frame when said pit lid is unseated from said bearing ledge.

6. An aircraft service pit lid assembly according to claim 5 wherein said hinge axle end seating slots are inclined at a an angle of about one hundred twenty degrees.

7. An aircraft service pit lid assembly comprising:

a frame for installation into a surface across which aircraft travel and which defines a pit access opening therethrough entirely within its structure and said access opening is surrounded by a flat horizontal deck and said structure of said frame has a recessed bearing ledge beneath said deck encompassing said access opening and a hinge pocket is formed in said structure of said frame recessed beneath said deck adjacent said access opening and said hinge pocket has mutually opposing, upright pocket side walls extending downwardly from said deck, and a pair of straight, inclined hinge axle end slots are defined in said deck on opposing sides of said hinge pocket, and said hinge axle end slots intersect said deck and said pocket side walls and are inclined downwardly from said deck and toward said access opening and terminate at bottom surfaces and said hinge axle end slots are in coplanar relationship with each other and are of a uniform width and depth throughout their lengths, a lid having a flat upper surface and formed of a size and shape that fits within the lateral confines of said deck to rest upon said bearing ledge and a hinge leaf projects laterally outwardly from said lid and into said hinge pocket, and horizontally disposed hinge axle ends of uniform circular cross section throughout extending transversely from said hinge leaf and beyond said upright pocket side walls and into said hinge axle end slots, thereby forming a horizontal axis of lid rotation relative to said frame that is beneath the level of said deck, and said hinge axle ends are captured in said hinge axle end slots and seat upon said bottom surfaces thereof when said lid is lowered to rest upon said bearing ledge, and said hinge axle ends are completely disengageable from said hinge axle end slots when said pit lid is raised to expose said access opening.

8. An aircraft service pit lid assembly according to claim 7 wherein said hinge axle end seating slots are oriented at an obtuse angle of inclination of about one hundred twenty degrees.

* * * * *